(12) United States Patent
Chen et al.

(10) Patent No.: US 9,274,999 B2
(45) Date of Patent: Mar. 1, 2016

(54) COMMUNICATION SYSTEM AND OPTICAL NAVIGATION DEVICE

(71) Applicant: PixArt Imaging Inc., Hsin-Chu County (TW)

(72) Inventors: Chun-Wei Chen, Hsin-Chu County (TW); Yung-Chang Lin, Hsin-Chu County (TW); Tsung-Fa Wang, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 481 days.

(21) Appl. No.: 13/681,567

(22) Filed: Nov. 20, 2012

(65) Prior Publication Data

US 2013/0132624 A1 May 23, 2013

(30) Foreign Application Priority Data

Nov. 22, 2011 (TW) .............................. 100142672 A
May 4, 2012 (TW) .............................. 101115963 A

(51) Int. Cl.
*G06F 3/03* (2006.01)
*G06F 13/42* (2006.01)
*G06F 3/0354* (2013.01)
*G06F 3/033* (2013.01)

(52) U.S. Cl.
CPC ............ *G06F 13/4286* (2013.01); *G06F 3/033* (2013.01); *G06F 3/0317* (2013.01); *G06F 3/03543* (2013.01)

(58) Field of Classification Search
CPC ....... G06F 3/03543; G06F 3/038; G06F 3/03; G06F 3/0317; G06F 3/033; G06F 3/0304; G06F 13/385; G06F 13/1235
USPC .................... 710/105–106; 345/163; 701/400
See application file for complete search history.

(56) References Cited

U.S. PATENT DOCUMENTS

| | | | |
|---|---|---|---|
| 6,781,570 B1* | 8/2004 | Arrigo et al. ................... | 345/158 |
| 8,078,779 B2* | 12/2011 | Lin et al. .......................... | 710/73 |
| 8,447,910 B1* | 5/2013 | Yi et al. ......................... | 710/315 |
| 2006/0292987 A1 | 12/2006 | Ophir et al. | |
| 2011/0271191 A1* | 11/2011 | King .............................. | 715/719 |
| 2013/0127720 A1* | 5/2013 | Chen et al. ..................... | 345/163 |
| 2014/0300548 A1* | 10/2014 | Lye et al. ....................... | 345/163 |

OTHER PUBLICATIONS

"Characteristics of Serial Peripheral Interfaces (SPI) Timing Parameters for Optical Mouse Sensor"—M.K. Md Arshad, U. Hashim and Chew Ming Choo; 7 pages, dated 2006.*

* cited by examiner

*Primary Examiner* — Brian Misiura
(74) *Attorney, Agent, or Firm* — Hauptman Ham, LLP

(57) ABSTRACT

There is provided a communication system including a transmission interface, a master device and a slave device. The transmission interface includes a TR/ACK channel configured to transmit a trigger signal and an acknowledge signal and a DA channel configured to transmit a normal data or a simplified data. The master device sends the trigger signal via the TR/ACK channel before data transmission begins. The slave device sends the normal data or the simplified data to the master device via the DA channel after receiving the trigger signal.

17 Claims, 15 Drawing Sheets

US 9,274,999 B2

COMMUNICATION SYSTEM AND OPTICAL NAVIGATION DEVICE

CROSS REFERENCE TO RELATED APPLICATION

This application claims the priority benefit of Taiwan Patent Application Serial Number 100142672, filed on Nov. 22, 2011 and Taiwan Patent Application Serial Number 101115963, filed on May 4, 2012, the full disclosure of which are incorporated herein by reference.

BACKGROUND

1. Field of the Disclosure

This disclosure generally relates to a communication system and an optical navigation device and, more particularly, to a communication system and an optical navigation device capable of dynamically adjusting the data transmission format.

2. Description of the Related Art

An optical mouse utilizes a light source and an image sensor to detect a movement with respect to a tracking surface under the optical mouse. FIG. 1 shows a schematic block diagram of a conventional optical mouse. As shown in FIG. 1, the conventional optical mouse 1 includes a microprocessor 11 and an optical sensing module 12, wherein the microprocessor 11 and the optical sensing module 12 are connected together through a serial peripheral interface bus (SPI bus) 13. Generally, the SPI bus 13 may be a four-wire serial bus or a two-wire serial bus. The microprocessor 12 may acquire the displacement data obtained by the optical sensing module 12 via the SPI bus 13.

FIG. 2 shows a timing diagram of the read operation of a two-wire serial bus. When the SPI bus 13 is the two-wire serial bus, it may include a serial clock (SCLK) line and a serial data (SDA) line. The microprocessor 11 and the optical sensing module 12 may be designed to transmit data in 8-bit words. The microprocessor 11 issues a clock signal via the SCLK line. Each time the microprocessor 11 reads displacement data, totally 8 bytes of data including 2 bytes of synchronization data, 2 bytes of update data and 4 bytes of displacement data have to be transmitted on the SDA line, wherein the synchronization data and the update data have to include an address data 21 and 22 respectively, and the displacement data have to include the address data 23 related to an x-displacement and the address data 24 related to a y-displacement. If the transmission speed is 200 kHz, it needs to take 355 μs to transmit 8 bytes of data. Although it may use fewer I/O ports and spend lower cost to transmit data by using a two-wire serial bus, a longer transmission time is required to transmit the displacement data and it is not able to ensure the synchronization of the data transmission.

FIG. 3 shows a timing diagram of the read operation of a four-wire serial bus. When the SPI bus 13 is the four-wire serial bus, it may include a serial clock (SCLK) line, a master output slave input (MOSI) line, a master input slave output (MISO) line and a slave select (SS) line. Each time the microprocessor 11 reads displacement data, the microprocessor 11 sets the SS line to logic low and issues a clock signal via the SCLK line, and then sends the address data (31, 32 and 33) and data to the optical sensing module 12 via the MOSI line and receives the updated data, x-displacement and y-displacement from the optical sensing module 12 via the MISO line. As the synchronization data is no longer required, a shorter transmission time can be realized. That is, if the transmission speed is 200 kHz and a guide time is 5 μs, it still takes 265 μs to transmit data in 8-bit words. More I/O ports and a higher cost are necessary to transmit data by using a four-wire serial bus and a long transmission time is still required.

SUMMARY

One aspect of the present disclosure is to provide a transmission interface having a fast read mechanism. The transmission interface is used between a master device and a slave device. The transmission interface may include a TR channel and a DA channel. The TR channel is configured to transmit a trigger signal from the master device to the slave device before data transmission begins. The DA channel is configured to transmit readable data from the slave device to the master device after the slave device receives the trigger signal. The master device and the slave device are using a predetermined data transmission protocol so as to directly transmit the readable data without transmitting an address data related to the readable data.

Another aspect of the present disclosure is to provide a transmission interface have a fast read mechanism. The transmission interface is used between a master device and a slave device. The transmission interface may include a DA channel and a CLK channel. The slave device may be triggered to send readable data to the master device via the DA channel when a logic level of the CLK channel is maintained lower than a signal level and a logic level of the DA channel is changed. The master device and the slave device are using a predetermined data transmission protocol so as to directly transmit the readable data without transmitting an address data related to the readable data.

The present disclosure provides an optical navigation device. The optical navigation device includes an image sensing array, a transmission interface and a processing unit. The image sensing array is configured to capture a plurality of images. The transmission interface is configured to communicate with a host. The transmission interface may include a DA channel. The processing unit is connected to the image sensing array and the transmission interface and configured to successively generate displacement data according to the images. The processing unit may send the displacement data via the DA channel after being triggered.

It is another object of the present disclosure to provide a communication system and an optical navigation device capable of dynamically adjusting the data transmission format so as to further reduce the data transmission time and the usage frequency of the I/O ports.

The present disclosure further provides a communication system including a transmission interface, a master device and a slave device. The transmission interface includes a TR/ACK channel configured to transmit at least one trigger signal and an acknowledge signal and a DA channel configured to transmit a normal data or a simplified data. The master device sends a first trigger signal via the TR/ACK channel before data transmission begins. The slave device sends the normal data or the simplified data to the master device via the DA channel after receiving the first trigger signal, wherein the master device and the slave device are using a predetermined data transmission protocol so as to directly transmit the normal data or the simplified data without transmitting an address data related to the normal data and the simplified data.

The present disclosure further provides an optical navigation device including an image sensing array, a transmission interface and a processing unit. The image sensing array is configured to capture a plurality of images. The transmission interface is configured to communicate with a host and includes a TR channel and a DA channel. The processing unit is coupled to the image sensing array and the transmission interface and configured to calculate and output displacement data according to the images, wherein the processing unit sends a normal displacement data or a simplified displacement data to the host via the DA channel after receiving a first trigger signal via the TR channel.

The present disclosure further provides a communication system including a transmission interface, a master device and a slave device. The transmission interface includes a TR channel configured to transmit at least one trigger signal; an ACK channel configured to transmit an acknowledge signal; and a DA channel configured to transmit a normal data or a simplified data. The master device sends a trigger signal via the TR channel before data transmission begins. The slave device sends the normal data or the simplified data to the master device via the DA channel after receiving the first trigger signal, wherein the master device and the slave device are using a predetermined data transmission protocol so as to directly transmit the normal data or the simplified data without transmitting an address data related to the normal data or the simplified data.

In the communication system and the optical navigation device of the present disclosure, the normal data may be simplified by data compression or data repackaging, wherein it is able to determine whether to output the simplified data according to an identification result of the normal data made by the master device or the slave device.

The present disclosure provides a fast read mechanism which may transmit data using fewer transmission channels or I/O ports, and a total transmitted data byte is less in one read operation. Therefore, the data transmission time and the usage frequency of the I/O ports are reduced thereby reducing the electrical leakage of the device.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure provides a fast read mechanism which may use fewer transmission channels or I/O ports to transmit data, and a total transmitted data byte in one read operation is less. Therefore, it is able to reduce the data transmission time, the usage frequency of the I/O ports and the electrical leakage of the device.

Figure 1:
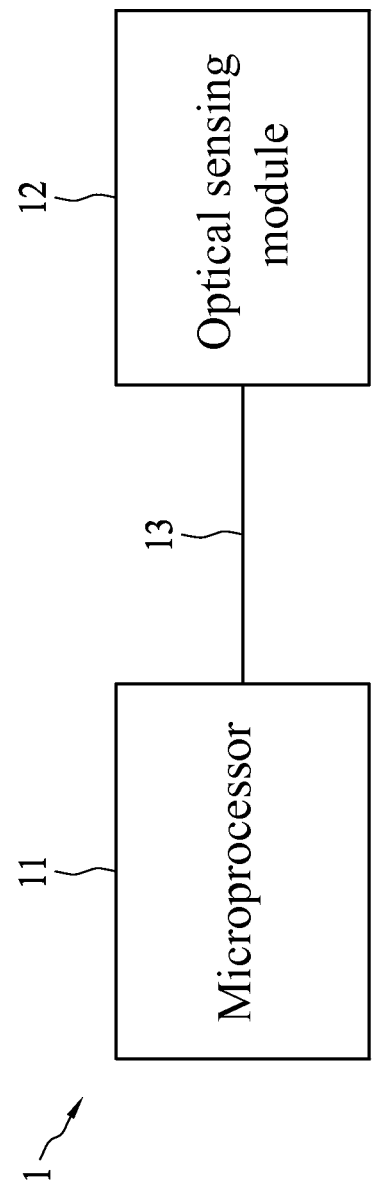
FIG. 1 shows a schematic block diagram of a conventional optical mouse.
Figure 2:
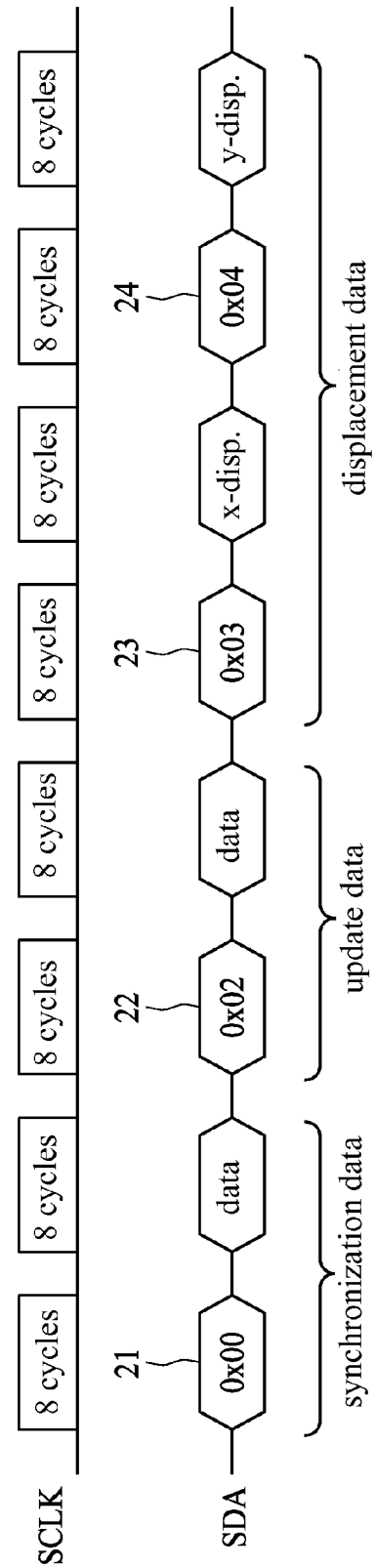
FIG. 2 shows a timing diagram of the read operation of a two-wire serial bus of the conventional optical mouse shown in FIG. 1.
Figure 3:
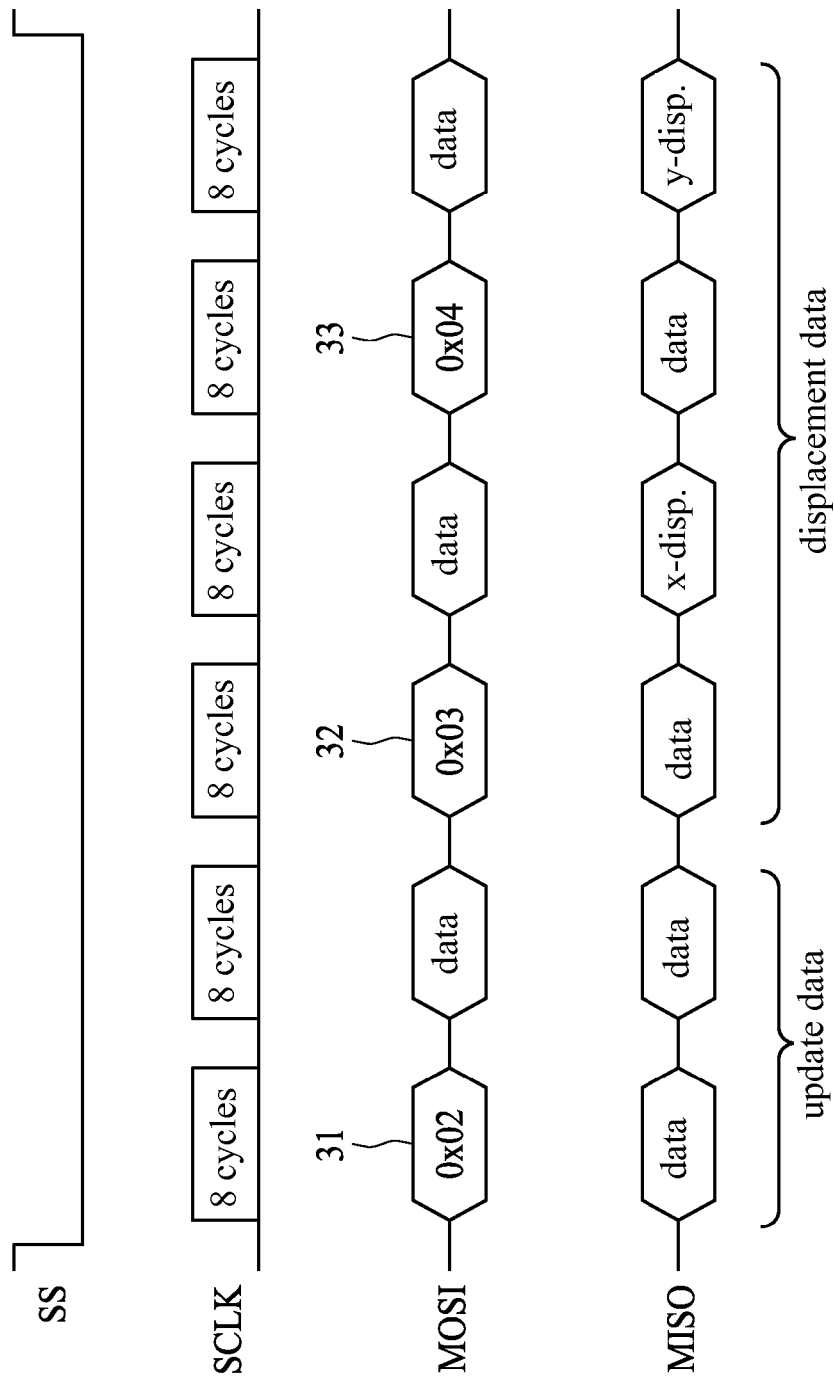
FIG. 3 shows a timing diagram of the read operation of a four-wire serial bus of the conventional optical mouse shown in FIG. 1.
Figure 4:
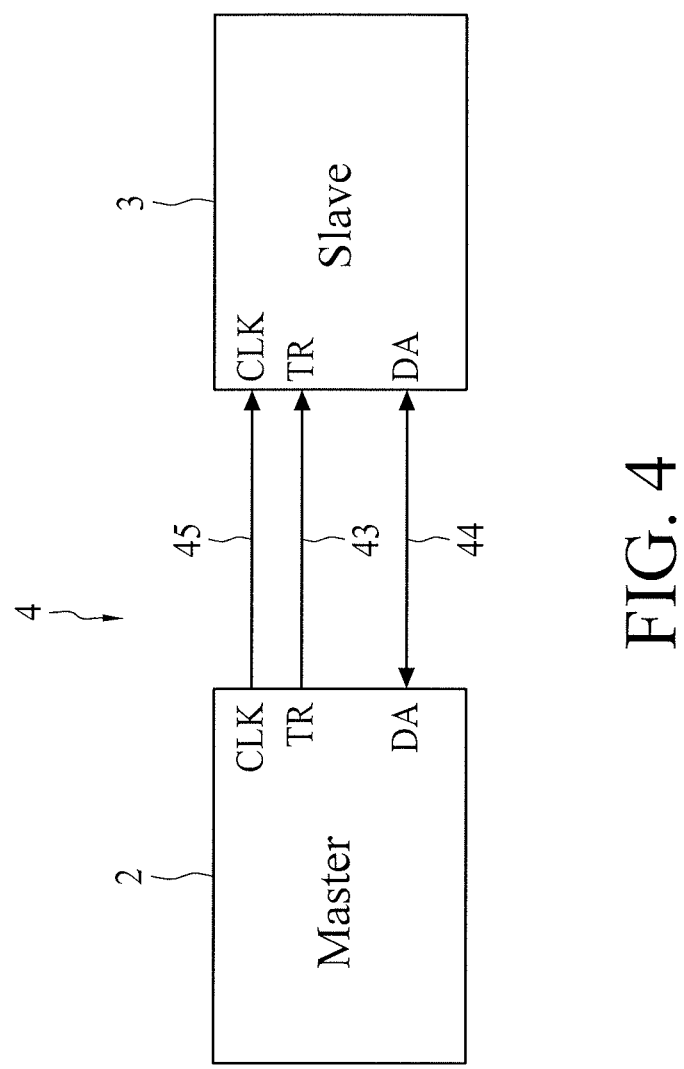
FIG. 4 shows a schematic diagram of the transmission interface having a fast read mechanism according to an embodiment of the present disclosure.

Referring to FIG. 4, it shows a schematic block diagram of the transmission interface 4 having a fast read mechanism according to an embodiment of the present disclosure which is configured to be connected between a master device 2 and a slave device 3. The transmission interface 4 may include a TR channel 43 and a DA channel 44, wherein the TR channel 43 is connected to a respective TR port of the master device 2 and the slave device 3; and the DA channel 44 is connected to a respective DA port of the master device 2 and the slave device 3.

Figure 5:
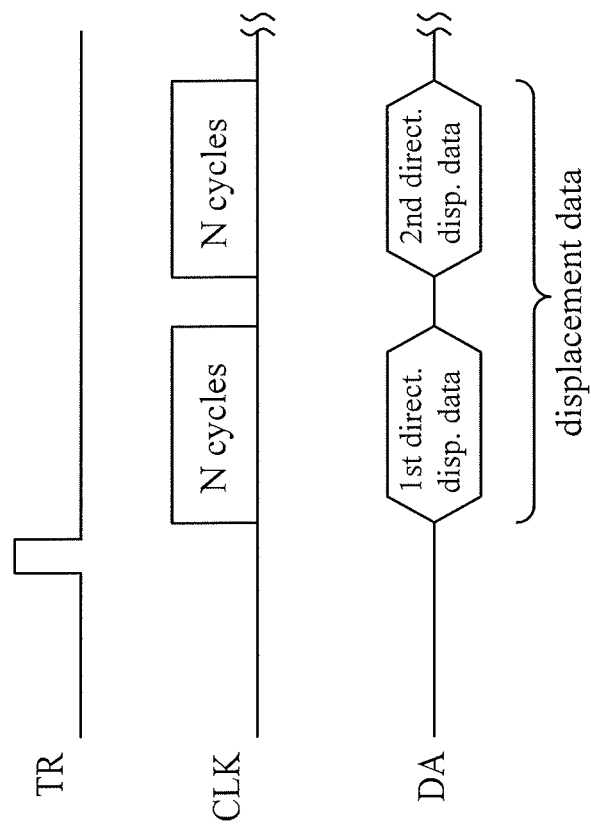
FIG. 5 shows a timing diagram of the read operation of the transmission interface having a fast read mechanism according to an embodiment of the present disclosure.

Referring to FIGS. 4 and 5, in a read operation, the master device 2 sends a trigger signal TR to the slave device 3 via the TR channel 43 before data transmission begins as shown in FIG. 5. The DA channel 44 is configured to allow the slave device 3 to transmit readable data DA to the master device 2 after the slave device 3 receives the trigger signal TR. The maser device 2 and the slave device 3 are using a predetermined data transmission protocol, wherein the master device 2 and the slave device 3 directly transmit the readable data DA according to the predetermined data transmission protocol without transmitting an address data.

The synchronization between the master device 2 and the slave device 3 may also be achieved by transmitting the trigger signal TR via an additional TR channel 43. According, the synchronization data is not necessary to be transmitted previous to the read operation such that a total transmitted data byte is reduced. Furthermore, as the address data is not necessary to be transmitted with the transmission of the readable data DA, a total transmitted data byte is further reduced in the read operation. For example as shown in FIG. 5, in transmitting data in 8-bit words (i.e. N=8), if the transmission speed is 200 kHz and the guide time is 5 μs, it only takes 85 μs to transmit the readable data DA to the master device 2. Therefore, the fast read mechanism according to an embodiment of the present disclosure may significantly reduce the data transmission time and the usage frequency of the I/O ports.

The trigger signal TR may be a logic low signal in a specific time interval or a logic high signal in a specific time interval.

In one embodiment, the transmission interface 4 may be a serial interface, but not limited thereto.

In one embodiment, the transmission interface 4 may be a serial peripheral interface bus (or SPI bus), but not limited thereto.

In one embodiment, the transmission interface 4 may be an I²C bus, but not limited thereto.

In one embodiment, the trigger signal TR may be a pre-agreed trigger signal such that the master device 2 and the slave device 3 may identify the trigger signal TR.

A signal width or a signal duration of the trigger signal TR may be as short as possible as long as it is detectable to the slave device 3. In other words, the signal width or the signal duration of the trigger signal TR is at least the minimum detectable pulse width of the slave device 3.

In one embodiment, the transmission interface 4 further includes a CLK channel 45. The master device 2 issues a clock signal via the CLK channel 45, wherein the CLK channel 45 is connected to a respective CLK port of the master device 2 and the slave device 3. In one embodiment, the signal width of the clock signal of the master device 2 and the slave device 3 is identical to the signal width of the trigger signal TR. In one embodiment, the signal width of the clock signal of the master device 2 and the slave device 3 is different from the signal width of the trigger signal TR. In one embodiment, the signal width of the clock signal of the master device 2 and the slave device 3 is independent from the signal width of the trigger signal TR, and the signal width of the clock signal may be set corresponding to different system applications. In other words, the signal width of the clock signal and that of the trigger signal TR are irrelevant and may be determined individually without considering a relation therebetween. In one embodiment, the signal width of the clock signal of the master device 2 and the slave device 3 is smaller than the signal width of the trigger signal TR.

In one embodiment, the trigger signal TR may be a hardware trigger signal, an edge trigger signal or a level trigger signal.

Figure 6:
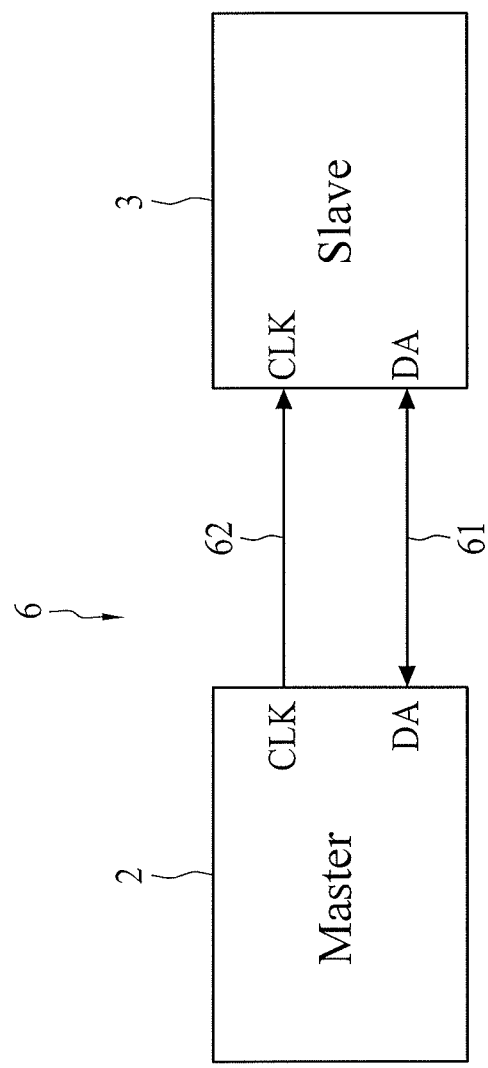
FIG. 6 shows a schematic diagram of the transmission interface having a fast read mechanism according to another embodiment of the present disclosure.

FIG. 6 shows a schematic block diagram of the transmission interface having a fast read mechanism according to another embodiment of the present disclosure. Another embodiment of the present disclosure provides a transmission interface 6 having a fast read mechanism which is configured to be connected between a master device 2 and a slave device 3. The transmission interface 6 includes a DA channel 61 and a CLK channel 62, wherein the DA channel 61 is connected to a respective DA port of the master device 2 and the slave device 3; and the CLK channel 62 is connected to a respective CLK port of the master device 2 and the slave device 3.

The master device 2 may keep the CLK channel 62 at logic low and change a logic level of the DA channel 61 so as to trigger the slave device 3 to send readable data DA to the master device 2 via the DA channel 61, wherein the master device 2 and the slave device 3 may directly transmit the readable data DA according to the predetermined data transmission protocol without transmitting an address data.

Figure 7:
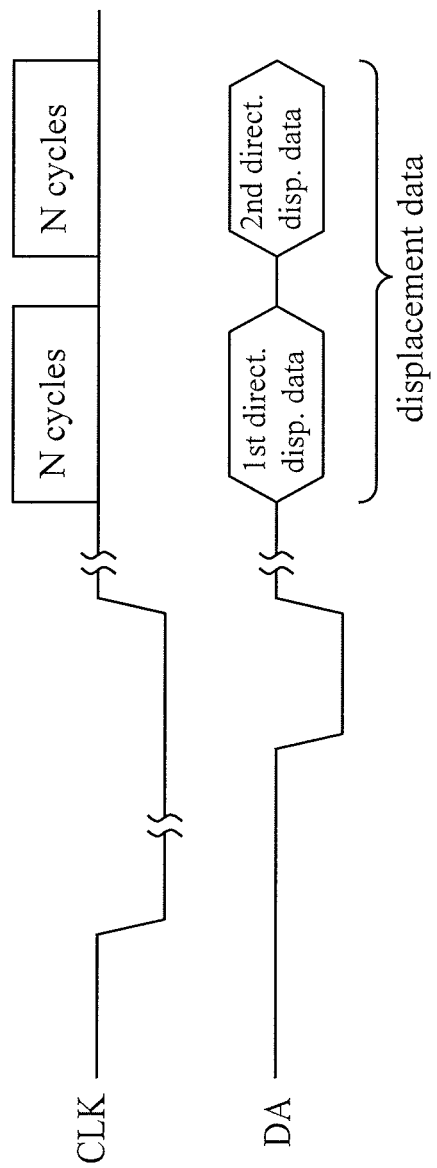
FIG. 7 shows a timing diagram of the read operation of the transmission interface having a fast read mechanism according to another embodiment of the present disclosure.

In one embodiment, referring to FIG. 7, when the master device 2 needs to read the readable data DA, the CLK port of the master device 2 is set to a logic low. During the time period that the CLK port is set to the logic low, if the DA port of the master device 2 is pulled low, it is able to synchronize the master device 2 to the slave device 3 and the slave device 3 is triggered to send the readable data DA.

In another embodiment, when the CLK port is at logic low and the DA part of the master device 2 is pulled high, the slave device 3 is triggered to send the readable data DA.

In another embodiment, when the CLK port is at logic high and the logic level of the DA port of the master device 2 is changed, the slave device 3 is triggered to send the readable data DA.

As an additional TR channel and a connection port thereof are not necessary, it is able to lower the cost. As the address data is not transmitted with the transmission of the readable data DA, a total transmitted data byte is reduced in the read operation thereby reducing the data transmission time and the usage frequency of the connection port.

In one embodiment, the triggering of the slave device 3 may be implemented by setting the CLK port to a predetermined logic level for a time period, wherein the time period is longer than the signal width of the clock signal. The slave device 3 may include a counter which starts to count when the CLK port is set to the predetermined logic level. If a count value reaches a predetermined count value, the readable data DA is outputted.

The aforementioned transmission interfaces having a fast read mechanism may be applied to various electronic products and are not limited to be applied to the optical navigation device mentioned hereinafter.

Figure 8:
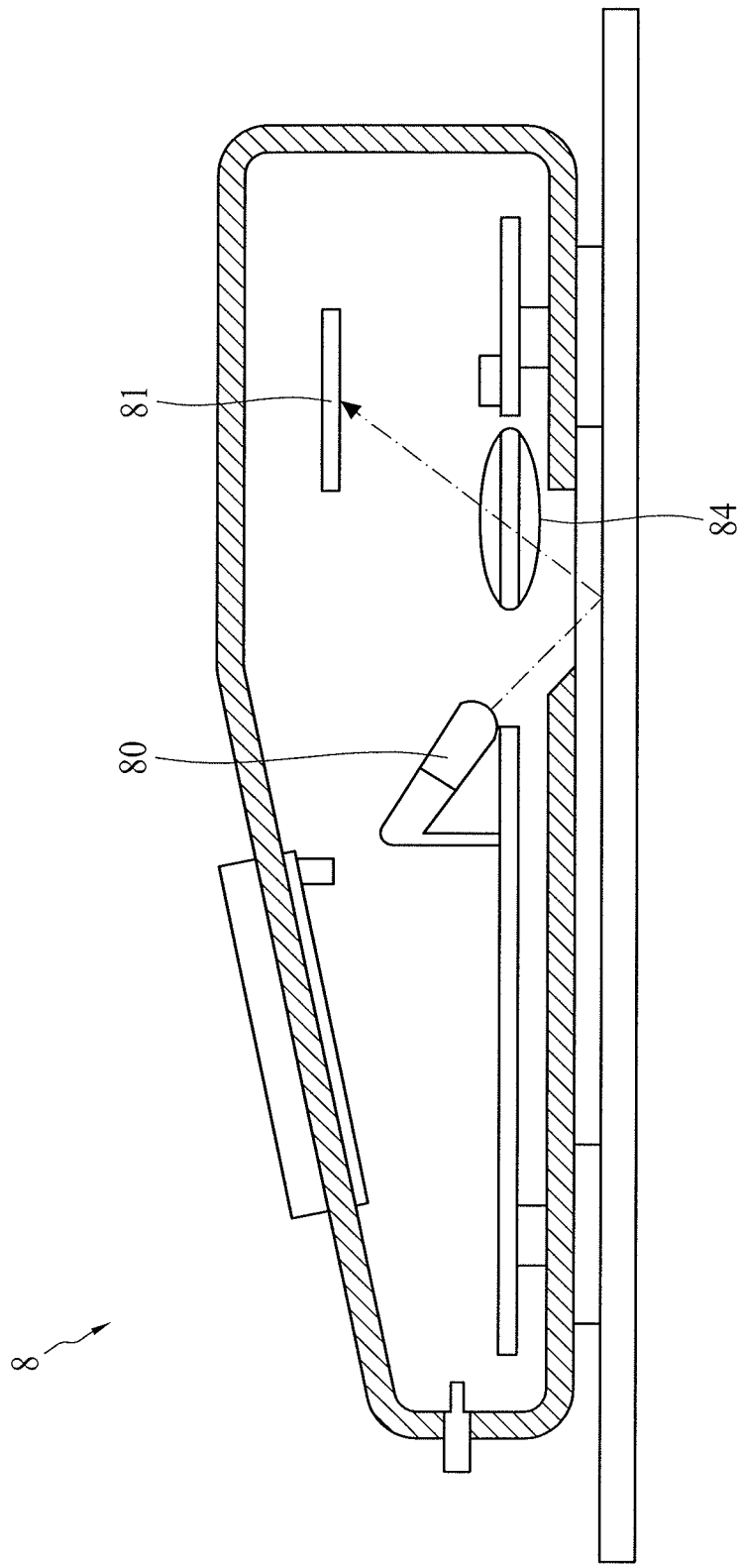
FIG. 8 shows a schematic cross section of the optical navigation device according to an embodiment of the present disclosure.
Figure 9:
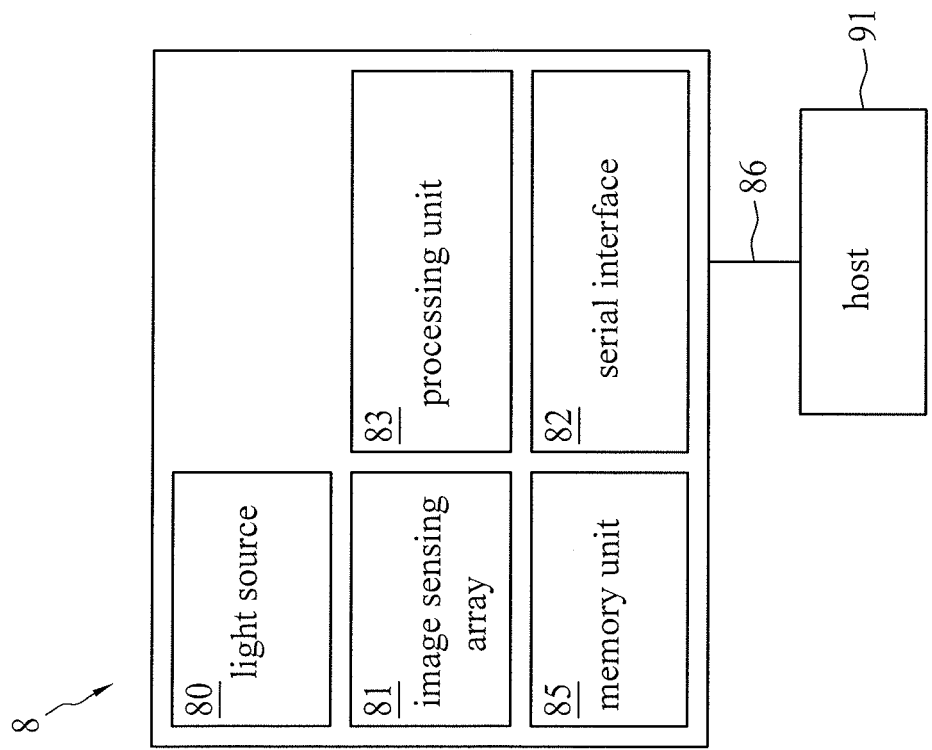
FIG. 9 shows a functional block diagram of the optical navigation device shown in FIG. 8.

FIG. 8 shows a schematic cross section of the optical navigation device 8 according to an embodiment of the present disclosure. FIG. 9 shows a functional block diagram of the optical navigation device 8. Referring to FIGS. 8 and 9, the optical navigation device 8 includes a light source 80, an image sensing array 81, a serial interface 82, a processing unit 83 and a lens 84. The light source 80 emits light to a tracking surface and the light beams may have a projection angle with respect to the tracking surface. The lens 84 is configured to direct reflected light from the tracking surface onto the image sensing array 81. The image sensing array 81 provides a plurality of images to the processing unit 83. The processing unit 83 is coupled to the image sensing array 81 and configured to analyze the plurality of images and calculate a position variation of at least one tracking feature in the plurality of images so as to successively generate displacement data of the optical navigation device 8.

In one embodiment, the displacement data may include a first direction displacement data and a second direction displacement data.

The optical navigation device 8 may further include a memory unit 85, wherein the obtained displacement data may be stored in the memory unit 85.

The serial interface 82 of the optical navigation device 8 may communicate with a host 91. The serial interface 82 is connected to a transmission interface 86 which may include a DA channel, wherein when the processing unit 83 is triggered, the processing unit 83 sends the displacement data to the host 91 via the DA channel.

In one embodiment, when the transmission interface 86 of the optical navigation device 8 is implemented by the transmission interface 4 shown in FIG. 4, the transmission interface 86 may further include a TR channel. The host 91 sends a trigger signal to the optical navigation device 8 via the TR channel. The optical navigation device 8 successively sends the displacement data to the host 91 after receiving the trigger signal. In one embodiment, the optical navigation device 8 updates the displacement data after receiving the trigger signal and then outputs the displacement data successively. As a waiting period of the host 9 between sending out the trigger signal and receiving the displacement data is substantially equal to a time period between receiving the trigger signal and outputting the displacement data of the optical navigation device 8, the optical navigation device 8 is considered to be synchronized to the host 91. In one embodiment, after the optical navigation device 8 receives the trigger signal, the optical navigation device 8 resets, synchronizes to the host 91, updates the displacement data and then outputs the displacement data.

The optical navigation device 8 and the host 91 are using a predetermined data transmission protocol, wherein the optical navigation device 8 and the host 91 may directly transmit the readable data according to the predetermined data transmission protocol without transmitting an address data.

The trigger signal may be a logic low signal in a specific time interval or a low high signal in a specific time interval. The trigger signal may be a pre-agreed trigger signal identifiable by the optical navigation device 8 and the host 91. A signal width or a signal duration is preferably as short as possible as long as it is detectable to the optical navigation device 8. In other words, the signal width or the signal duration of the trigger signal is at least the minimum detectable pulse width of the optical navigation device 8. The trigger signal may be a hardware trigger signal, an edge trigger signal or a level trigger signal.

The transmission interface 86 may further include a CLK channel. The host 91 issues a clock signal via the CLK channel. In one embodiment, the signal width of the clock signal of the optical navigation device 8 and the host 91 is identical to the signal width of the trigger signal. In one embodiment, the signal width of the clock signal of the optical navigation device 8 and the host 91 is different from the signal width of the trigger signal. In one embodiment, the signal width of the clock signal of the optical navigation device 8 and the host 91 is independent from the signal width of the trigger signal, and the signal width of the clock signal may be set corresponding to different system applications. In one embodiment, the signal width of the clock signal of the optical navigation device 8 and the host 91 is smaller than the signal width of the trigger signal.

In another embodiment, when the transmission interface 86 of the optical navigation device 8 is implemented by the transmission interface 6 shown in FIG. 6, the transmission interface 86 may include a DA channel and a CLK channel. The host 91 may keep the CLK channel at logic low and change the logic level of the DA channel so as to trigger the optical navigation device 8 to send the readable data to the host 91 via the DA channel, wherein the optical navigation device 8 and the host 91 may directly transmit the readable data according to the predetermined data transmission protocol without transmitting an address data. In another embodiment, the CLK channel may be set to a predetermined logic level for a time period so as to trigger the optical navigation device 8 to transmit the readable data to the host 91 via the DA channel.

Figure 10:
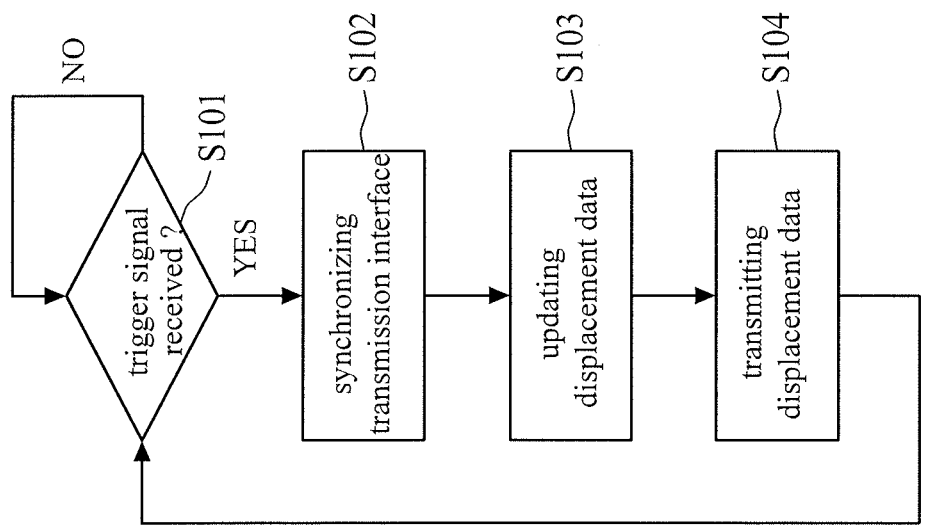
FIG. 10 shows a flow chart of the fast read mechanism according an embodiment of the present disclosure.

FIG. 10 shows a flow chart of the fast read mechanism according an embodiment of the present disclosure. In Step S101, the slave device confirms whether a trigger signal from the master device is received. If the trigger signal is received, leave Step S101 and enter Step S102. In the Step S102, the master device is synchronized to the slave device. In Step S103, the slave device updates the displacement data. In Step S104, the slave device directly outputs the displacement data, wherein the displacement data does contain corresponding address data.

In another embodiment, the master device 2 or the slave device 3 may compare a displacement data with a displacement threshold so as to determine whether to output a normal data or a simplified data in order to further reduce the data transmission time and the usage frequency of the I/O ports. For example, when at least one of a first direction displacement, a second direction displacement, a combined displacement vector of the first direction displacement and the second direction displacement and a sum of lengths of the first direction displacement and the second direction displacement is smaller than the displacement threshold, it means that the displacement is very small such that the simplified data may be transmitted. In other words, when the displacement is very small, a bit repetition rate of the data indicating the displacement is relatively high such that a part of the bits in the data may not be transmitted, wherein said simplified data may be a compressed data or a repackaged data of the normal data; for example, repackaging the bit of interest (BOI) of the normal data. Herein said normal data is the readable data referred in the previous embodiments.

Figure 11:
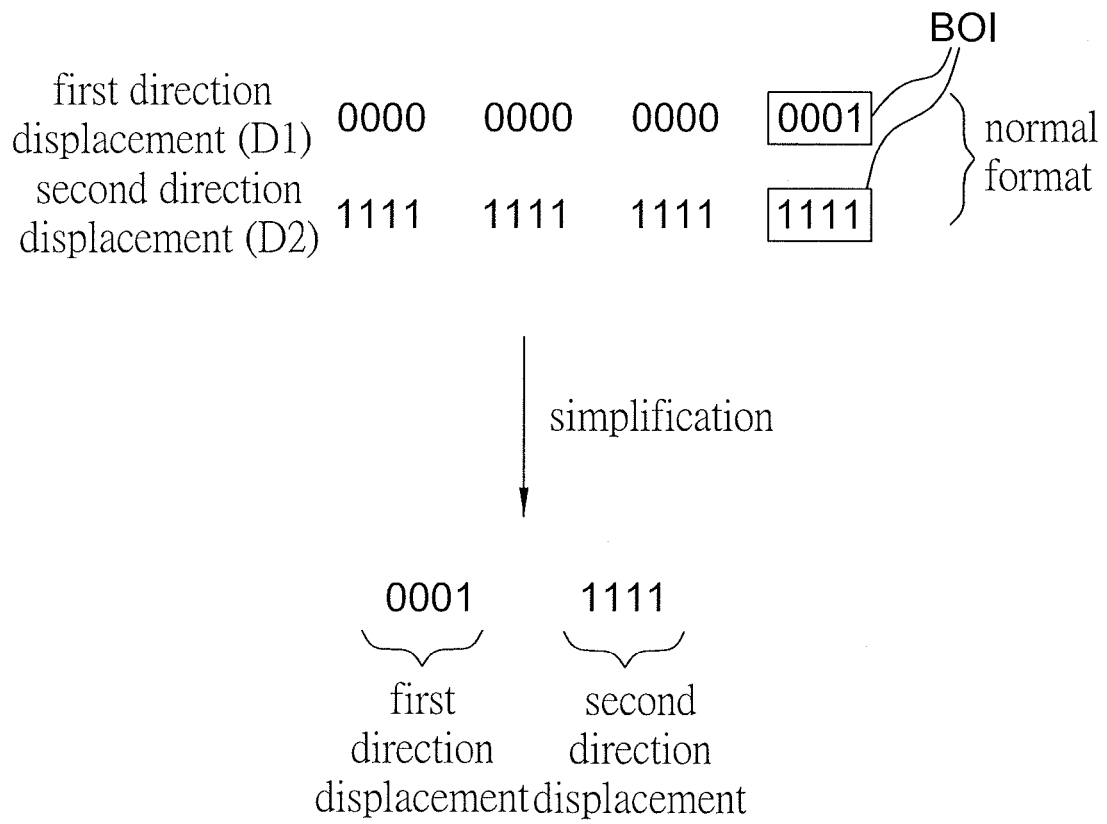
FIG. 11 shows a schematic diagram of converting normal data into simplified data according to the embodiment of the present disclosure.

Referring to FIG. 11, it shows an embodiment of the data format having 16-bit words and the output data having 8-bit words, wherein the first direction displacement and the second direction displacement are respectively indicated by 16-bit words (2 bytes) data (i.e. normal format). Herein, it is assumed that the first direction displacement is indicated by "0000 0000 0000 0001" and the second direction displacement is indicated by "1111 1111 1111 1111". The slave device 3 may convert the normal data to simplified data, such as "0001 1111" before outputting the displacement data. In this manner, the displacement data in two directions are embedded in 1 byte of data and no data loss can occur. Therefore, as only 8 bits of data are transmitted, it is able to further reduce 75% of the data transmission time. In other words, when the master device 2 or the slave device 3 identifies that a bit repetition rate of the normal data is higher than a threshold (for example, but not limited to, 50%~75%), the slave device 3 may first convert the normal data into simplified data before outputting the displacement data. It is appreciated that the number and the position of BOI in the normal data are not limited to those shown in FIG. 11.

It is appreciated that FIG. 11 only shows an embodiment of converting a normal format to a simplified format, and it is able to repackage the normal data using other conventional methods. It is appreciated that the normal format of the displacement is not limited to 16-bit words and the simplified format is not limited to 8-bit words. The simplification is achieved as long as a bit number of the simplified format is lower than that of the normal format.

Figure 12:
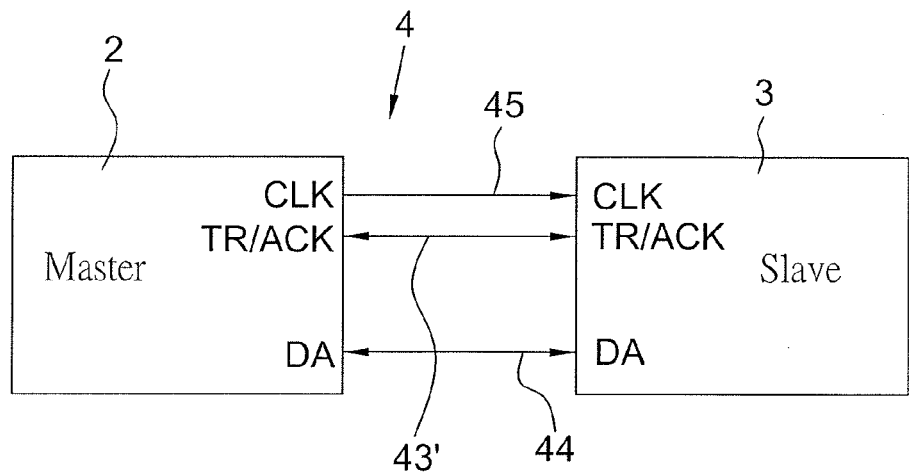
FIG. 12 shows a schematic diagram of the communication system according to an embodiment of the present disclosure.

Referring to FIG. 12, it shows a schematic block diagram of the communication system according to an embodiment of the present disclosure including a master device 2, a slave device 3 and a transmission interface 4. The transmission interface 4 includes a TR/ACK channel 43' (or simply referred to a TR channel), a DA channel 44 and a CLK channel 45, wherein the TR/ACK channel 43' is connected to a respective TR/ACK port of the master device 2 and the slave device 3; the DA channel 44 is connected to a respective DA port of the master device 2 and the slave device 3; and the CLK channel 45 is connected to a respective CLK port of the master device 2 and the slave device 3. The TR/ACK channel 43' is configured to transmit at least one trigger signal and an acknowledge signal; the DA channel 44 is configured to transmit a normal data or a simplified data; and the CLK channel 45 is configured to transmit a clock signal (details will be described hereinafter). The master device 2 sends a first trigger signal via the TR/ACK channel 43' before data transmission begins. The slave device 3 sends the normal data or the simplified data to the master device 2 via the DA channel 44 after receiving the first trigger signal. As mentioned above, the master device 2 and the slave device 3 are using a predetermined data transmission protocol so as to directly transmit the normal data or the simplified data without transmitting an address data related to the normal data or the simplified data;

that is, the first trigger signal and the acknowledge signal may be pre-agreed trigger signals, hardware trigger signals, edge trigger signals or level trigger signals, and are configured to perform synchronization and data updating between the master device 2 and the slave device 3.

In one embodiment, the master device 2 may be a host and the slave device 3 may be an optical navigation device, and the normal data and the simplified data may be displacement data.

Figure 12A:
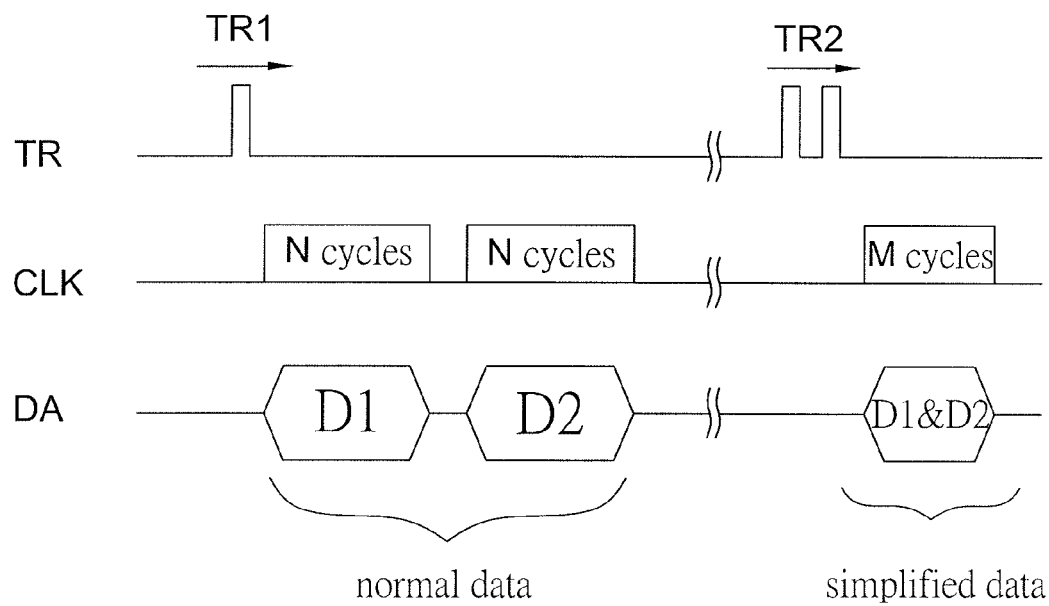
FIGS. 12A-12C show schematic diagrams of the data transmission of the communication system shown in FIG. 12.

Referring to FIGS. 12 and 12A, in one embodiment, the master device 2 sends a first trigger signal TR1 via the TR/ACK channel 43' before the data transmission begins; and the slave device 3 sends the normal data via the DA channel 44 after receiving the first trigger signal TR1. Next, after the master device 2 receives the normal data and identifies that a bit repetition rate of the normal data is higher than a threshold, the master device 2 sends a second trigger signal TR2 to inform the slave device 3 to change to send the simplified data. The slave device 3 converts the normal data to the simplified data and then sends the simplified data. In this embodiment, preferably the first trigger signal TR1 and the second trigger signal TR2 are different, e.g. having different numbers of rising edges or falling edges or having different rising time or falling time without any limitation as long as the master device 2 and the slave device 3 are pre-agreed to be able to distinguish therebetween. More specifically, in this embodiment the slave device 3 sends the simplified data when receiving the notification from the master device 2 without replying an acknowledge signal; wherein as mentioned above the first trigger signal TR1 and the second trigger signal TR2 may also achieve the synchronization between the master device 2 and the slave device 3 and thus the synchronization data is not necessary to be transmitted previous to the read operation. Furthermore, an address data is not necessary to be transmitted in transmitting the normal data or the simplified data.

Figure 12B:
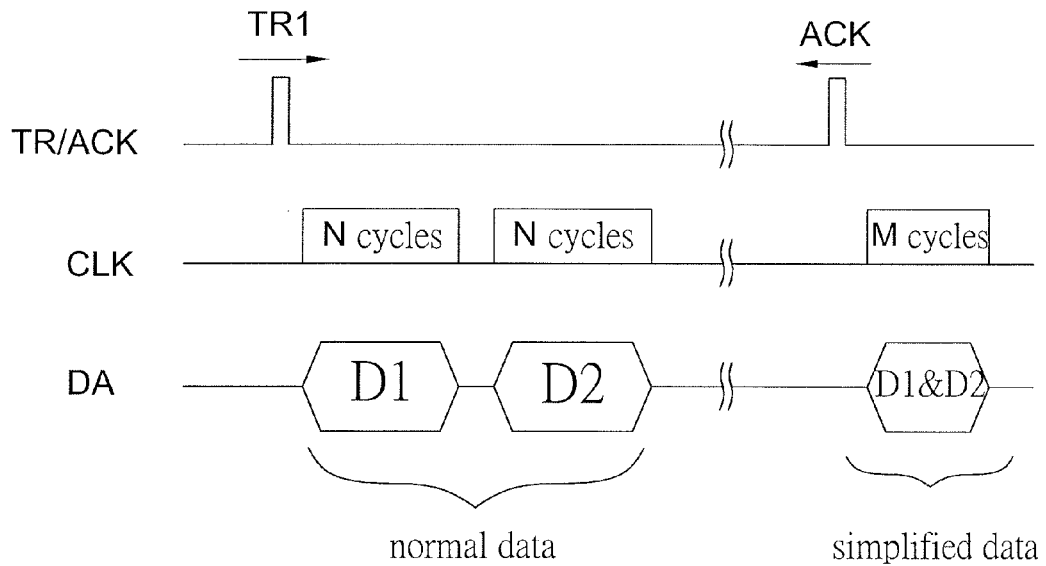

Referring to FIGS. 12 and 12B, in another embodiment the master device 2 sends a first trigger signal TR1 via the TR/ACK channel 43' before the data transmission begins; and the slave device 3 sends the normal data via the DA channel 44 after receiving the first trigger signal TR1. Next, after the slave device 3 identifies that a bit repetition rate of the normal data is higher than a threshold, the slave device 3 sends an acknowledge signal ACK to the master device 2 and then starts to send the simplified data. It should be mentioned that, in this embodiment when the slave device 3 receives the first trigger signal TR1 and identifies that a bit repetition rate of the normal data is higher than a threshold, the slave device 3 may not send the normal data but directly send the acknowledge signal ACK to the master device 2 and then starts to send the simplified data; that is, the normal data may not be included in FIG. 12B. As mentioned above, the first trigger signal TR1 and the acknowledge signal ACK may also achieve the synchronization between the master device 2 and the slave device 3 and thus the synchronization data is not necessary to be transmitted previous to the read operation. Furthermore, an address data is not necessary to be transmitted in transmitting the normal data or the simplified data.

Figure 12C:
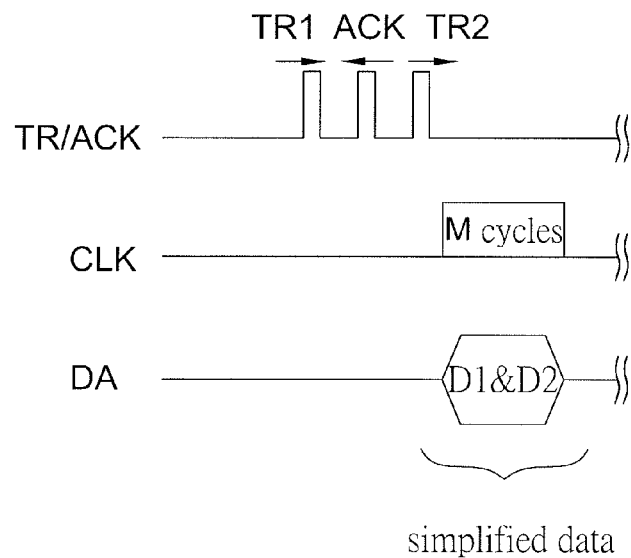

Referring to FIGS. 12 and 12C, in another embodiment the master device 2 sends a first trigger signal TR1 via the TR/ACK channel 43' before the data transmission begins; and after the slave device 3 receives the first trigger signal TR1 and identifies that a bit repetition rate of the normal data is higher than a threshold, the slave device 3 sends an acknowledge signal ACK to the master device 2; the slave device 3 starts to send the simplified data only after receiving a second trigger signal TR2 sent from the master device 2. More specifically, in this embodiment the slave device 3 will send the simplified data to the master device 2 only after the mutual authentication between the master device 2 and the slave device 3. In this embodiment, the first trigger signal TR1 and the second trigger signal TR2 may be identical or different. As mentioned above, the second trigger signal TR2 may also achieve the synchronization between the master device 2 and the slave device 3 and thus the synchronization data is not necessary to be transmitted previous to the read operation. Furthermore, an address data is not necessary to be transmitted in transmitting the simplified data.

It should be mentioned that in FIGS. 12A to 12C, the arrows below TR1, TR2 and ACK are used to indicate the signal transmission direction, wherein the right-directed arrow indicates that the signal is sent from the master device to the slave device; and the left-directed arrow indicates that the signal is sent from the slave device to the master device.

Figure 13:
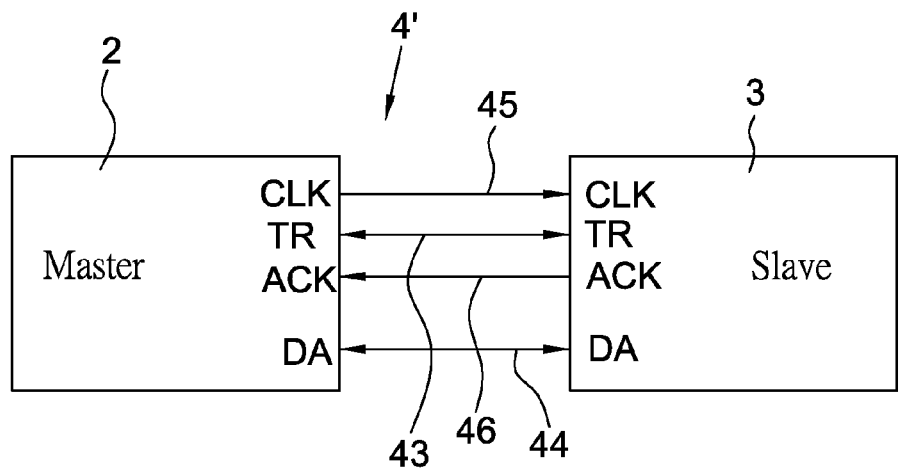
FIG. 13 shows a schematic diagram of the communication system according to another embodiment of the present disclosure.

Referring to FIG. 13, it shows a schematic block diagram of the communication system according to another embodiment of the present disclosure including a master device 2, a slave device 3 and a transmission interface 4'. The transmission interface 4' includes a TR channel 43, a DA channel 44, a CLK channel 45 and an ACK channel 46, wherein the TR channel 43 is connected to a respective TR port of the master device 2 and the slave device 3; the DA channel 44 is connected to a respective DA port of the master device 2 and the slave device 3; the CLK channel 45 is connected to a respective CLK port of the master device 2 and the slave device 3; and the ACK channel 46 is connected to a respective ACK port of the master device 2 and the slave device 3. The TR channel 43 is configured to transmit at least one trigger signal; the DA channel 44 is configured to transmit a normal data or a simplified data; the CLK channel 45 is configured to transmit a clock signal; and the ACK channel 46 is configured to transmit an acknowledge signal (details will be described hereinafter). The master device 2 sends a first trigger signal via the TR channel 43 before data transmission begins. The slave device 3 sends the normal data or the simplified data to the master device 2 via the DA channel 44 after receiving the first trigger signal. Similarly, the master device 2 and the slave device 3 are using a predetermined data transmission protocol so as to directly transmit the normal data or the simplified data without transmitting an address data related to the normal data or the simplified data; that is, the first trigger signal and the acknowledge signal may be pre-agreed trigger signals, hardware trigger signals, edge trigger signals or level trigger signals, and are configured to perform synchronization and data updating between the master device 2 and the slave device 3.

In one embodiment, the master device 2 may be a host and the slave device 3 may be an optical navigation device, and the normal data and the simplified data may be displacement data.

Figure 13A:
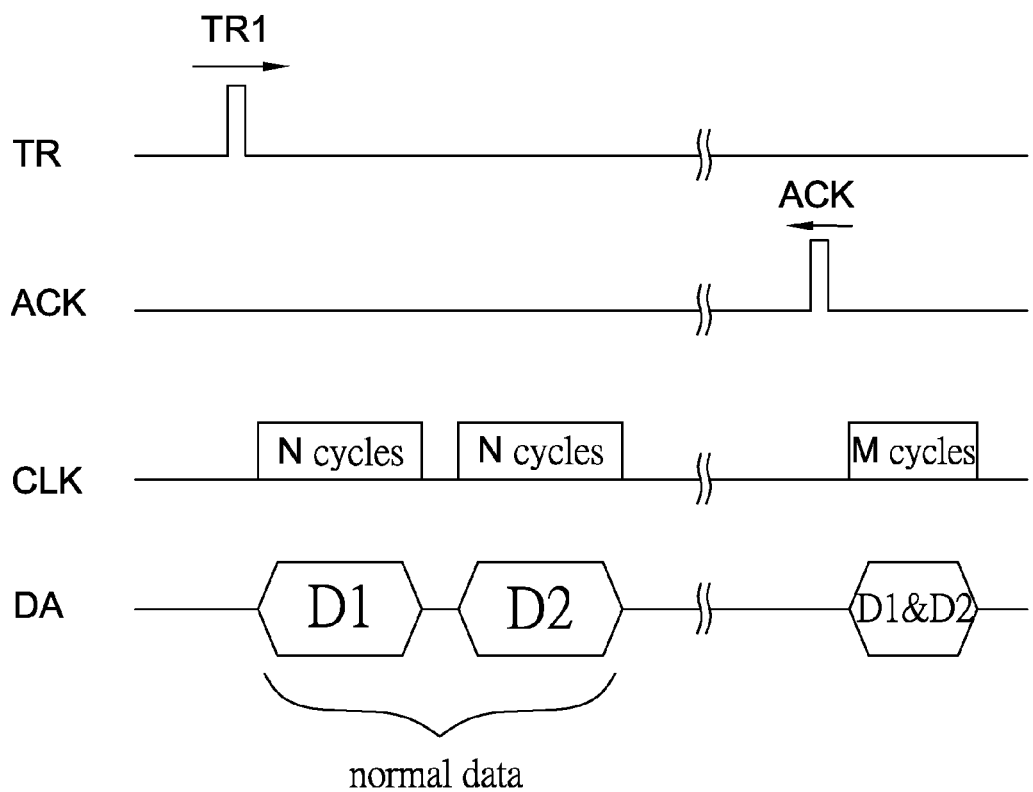
FIGS. 13A-13B show schematic diagrams of the data transmission of the communication system shown in FIG. 13.

Referring to FIGS. 13 and 13A, in one embodiment the master device 2 sends a first trigger signal TR1 via the TR channel 43 before the data transmission begins; and the slave device 3 sends the normal data via the DA channel 44 after receiving the first trigger signal TR1. Next, after the slave device 3 identifies that a bit repetition rate of the normal data is higher than a threshold, the slave device 3 sends an acknowledge signal ACK to the master device 2 via the ACK channel 46 and then starts to send the simplified data. It should be mentioned that, in this embodiment when the slave device 3 receives the first trigger signal TR1 and identifies that a bit repetition rate of the normal data is higher than a threshold, the slave device 3 may not send the normal data but directly send the acknowledge signal ACK to the master device 2 via the ACK channel 46 and then starts to send the simplified data; that is, the normal data may not be included in FIG. 13A. As mentioned above, the first trigger signal TR1 and the acknowledge signal ACK may also achieve the synchronization between the master device 2 and the slave device 3 and thus the synchronization data is not necessary to be transmitted previous to the read operation. Furthermore, an address data is not necessary to be transmitted in transmitting the normal data or the simplified data.

Figure 13B:
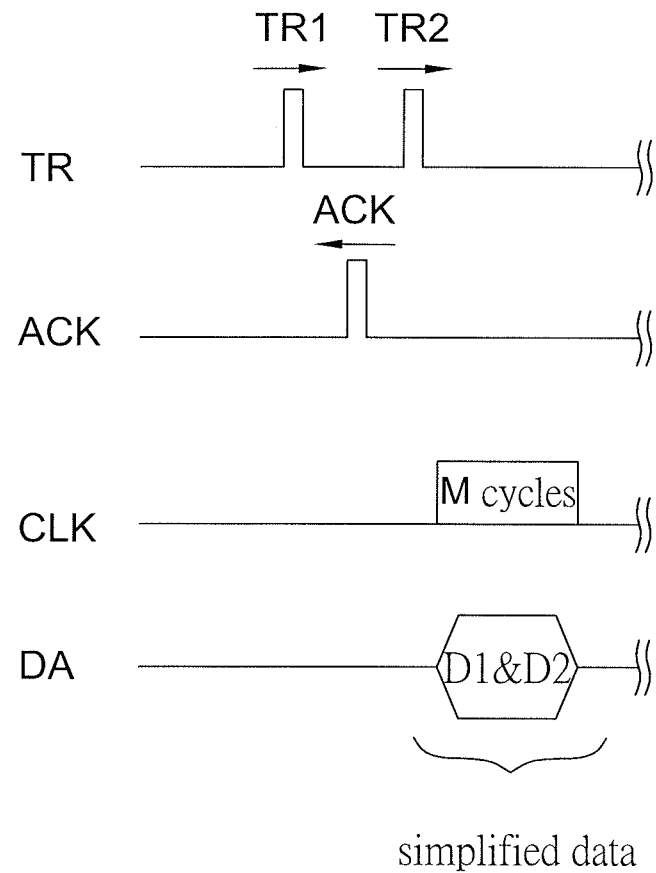

Referring to FIGS. 13 and 13B, in another embodiment the master device 2 sends a first trigger signal TR1 via the TR channel 43 before the data transmission begins; and after the slave device 3 receives the first trigger signal TR1 and identifies that a bit repetition rate of the normal data is higher than a threshold, the slave device 3 sends an acknowledge signal ACK to the master device 2 via the ACK channel 46; the slave device 3 starts to send the simplified data only after receiving a second trigger signal TR2 sent from the master device 2. More specifically, the main difference between FIG. 13 and FIG. 12 is that the communication system in FIG. 13 further includes an ACK channel 46 configured to transmit the acknowledge signal ACK and the TR channel 43 is only for transmitting the trigger signals TR1 and TR2. As mentioned above, the second trigger signal TR2 may also realize the synchronization between the master device 2 and the slave device 3 and thus the synchronization data is not necessary to be transmitted previous to the read operation. Furthermore, an address data is not necessary to be transmitted in transmitting the simplified data.

It should be mentioned that in FIGS. 13A and 13B, the arrows below TR1, TR2 and ACK are used to indicate the signal transmission direction, wherein the right-directed arrow indicates that the signal is sent from the master device to the slave device; and the left-directed arrow indicates that the signal is sent from the slave device to the master device.

When the transmission interface 4 of FIG. 12 and the transmission interface 4' of FIG. 13 are applied to an optical navigation device (as shown in FIG. 9), the optical navigation device 8 may be configured to transmit the simplified data to the host 91 in order to further reduce the data transmission time and the usage frequency of the I/O ports. The optical navigation device 8 and the host 91 are using a predetermined data transmission protocol, wherein the optical navigation device 8 and the host 91 directly transmit the normal data or the simplified data according to the predetermined data transmission protocol without transmitting an address data.

Referring to FIG. 9 again, the optical navigation device employing the transmission interface shown in FIG. 12 includes an image sensing array 81, a transmission interface 86 and a processing unit 83. The image sensing array 81 is configured to capture a plurality of images (as shown in FIG. 8); the transmission interface 86 is configured to communicate with a host 91 and includes a TR/ACK channel and a DA channel; the processing unit 83 is coupled to the image sensing array 81 and the transmission interface 86 and configured to calculate and output displacement data according to the images, wherein the processing unit 83 sends a normal data or a simplified data to the host 91 via the DA channel after receiving a first trigger signal via the TR/ACK channel.

In one embodiment, the processing unit 83 sends an acknowledge signal to the host 91 and then starts to send the simplified displacement data when identifying that the normal displacement data is smaller than a displacement threshold, wherein details of this embodiment are similar to descriptions related to FIGS. 12B and 13A and thus are not repeated herein.

In another embodiment, the processing unit 83 sends an acknowledge signal to the host 91 and receives a second trigger signal sent from the host 91 sequentially and then starts to send the simplified displacement data when identifying that the normal displacement data is smaller than a displacement threshold, wherein details of this embodiment are similar to descriptions related to FIGS. 12C and 13B and thus are not repeated herein. In addition, in this embodiment the acknowledge signal may be transmitted via the TR channel (as FIG. 12). In another embodiment, the transmission interface 86 may further include an ACK channel configured to transmit the acknowledge signal (as FIG. 13).

In the above embodiments, when a bit repetition rate of the normal data (e.g. the displacement data) is lower than a threshold (or the displacement is larger than a displacement threshold), the normal data is continuously outputted.

In the above embodiments, features of the first trigger signal TR1 and the second trigger signal TR2 are similar to those of the trigger signal TR of FIG. 4; the transmission interfaces of FIGS. 12 and 13 are similar to the transmission interface of FIG. 4 which may be a serial interface, a SPI bus or an I$^2$C bus.

In the embodiments of the present disclosure, as the bit number of the simplified data is lower than that of the normal data, a cycle number M of the clock signal associated with the simplified data is lower than a cycle number N of the clock signal associated with the normal data; that is M<N, and M and N are multiples of 2.

As mentioned above, in the conventional optical mouse, the SPI bus needs to take more time to transmit data. Therefore, the present disclosure further provides an optical navigation device and a communication system (FIGS. 12 and 13) which may reduce the data transmission time, the usage frequency of the I/O ports and the electric leakage of the device.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A communication system, comprising:
   a transmission interface, comprising:
   a TR/ACK channel configured to transmit at least one trigger signal and an acknowledge signal; and
   a DA channel configured to transmit a normal data or a simplified data;
   a master device sending a first trigger signal via the TR/ACK channel before data transmission begins; and
   a slave device sending the normal data or the simplified data to the master device via the DA channel after receiving the first trigger signal;
   wherein the master device and the slave device are configured to use a predetermined data transmission protocol to directly transmit the normal data or the simplified data without transmitting an address data related to the normal data and the simplified data,
   wherein the simplified data is a compressed data or a repackaged data of the normal data.

2. The communication system as claimed in claim 1, wherein the master device sends a second trigger signal to inform the slave device to send the simplified data when receiving the normal data and identifying that a bit repetition rate of the normal data is higher than a threshold.

3. The communication system as claimed in claim 1, wherein after the slave device sends the acknowledge signal to the master device, the slave device sends the simplified data when identifying that a bit repetition rate of the normal data is higher than a threshold.

4. The communication system as claimed in claim 1, wherein after the slave device sends the acknowledge signal to the master device and receives a second trigger signal sent from the master device sequentially, the slave device sends the simplified data when identifying that a bit repetition rate of the normal data is higher than a threshold.

5. The communication system as claimed in claim 1, wherein the first trigger signal and the acknowledge signal are pre-agreed trigger signals, hardware trigger signals, edge trigger signals or level trigger signals, and configured to perform synchronization and data updating between the master device and the slave device.

6. The communication system as claimed in claim 1, wherein the master device is a host and the slave device is an optical navigation device, and the normal data and the simplified data are displacement data.

7. An optical navigation device, comprising:
    an image sensing array configured to capture a plurality of images;
    a transmission interface configured to communicate with a host and comprising a TR channel and a DA channel; and
    a processing unit coupled to the image sensing array and the transmission interface and configured to calculate and output displacement data according to the images, wherein the processing unit sends a normal displacement data or a simplified displacement data to the host via the DA channel after receiving a first trigger signal via the TR channel,
    wherein the simplified displacement data is a compressed data or a repackaged data of the normal displacement data.

8. The optical navigation device as claimed in claim 7, wherein after the processing unit sends an acknowledge signal to the host, the processing unit sends the simplified displacement data when identifying that the normal displacement data is smaller than a displacement threshold.

9. The optical navigation device as claimed in claim 7, wherein after the processing unit sends an acknowledge signal to the host and receives a second trigger signal sent from the host sequentially, the processing unit sends the simplified displacement data when identifying that the normal displacement data is smaller than a displacement threshold.

10. The optical navigation device as claimed in claim 8, wherein the transmission interface further comprises an ACK channel configured to transmit the acknowledge signal.

11. The optical navigation device as claimed in claim 8, wherein the acknowledge signal is transmitted via the TR channel.

12. The optical navigation device as claimed in claim 7, wherein the first trigger signal and the acknowledge signal are pre-agreed trigger signals, hardware trigger signals, edge trigger signals or level trigger signals, and configured to perform synchronization and data updating between the host and the processing unit.

13. A communication system, comprising:
    a transmission interface, comprising:
        a TR channel configured to transmit at least one trigger signal;
        an ACK channel configured to transmit an acknowledge signal; and
        a DA channel configured to transmit a normal data or a simplified data;
    a master device sending a trigger signal via the TR channel before data transmission begins; and
    a slave device sending the normal data or the simplified data to the master device via the DA channel after receiving the first trigger signal;
    wherein the master device and the slave device are using a predetermined data transmission protocol to directly transmit the normal data or the simplified data without transmitting an address data related to the normal data or the simplified data,
    wherein the simplified data is a compressed data or a repackaged data of the normal data.

14. The communication system as claimed in claim 13, wherein after the slave device sends the acknowledge signal to the master device, the slave device sends the simplified data when identifying that a bit repetition rate of the normal data is higher than a threshold.

15. The communication system as claimed in claim 13, wherein after the slave device sends the acknowledge signal to the master device and receives a second trigger signal sent from the master device sequentially, the slave device sends the simplified data when identifying that a bit repetition rate of the normal data is higher than a threshold.

16. The communication system as claimed in claim 13, wherein the first trigger signal and the acknowledge signal are pre-agreed trigger signals, hardware trigger signals, edge trigger signals or level trigger signals, and configured to perform synchronization and data updating between the master device and the slave device.

17. The communication system as claimed in claim 13, wherein the master device is a host and the slave device is an optical navigation device, and the normal data and the simplified data are displacement data.

* * * * *